United States Patent [19]
Jilling et al.

[11] Patent Number: 6,032,402
[45] Date of Patent: Mar. 7, 2000

[54] FISH HOOK AND WEED GUARD DEVICE

[75] Inventors: John Jilling, Westminster; Joseph E. Bartell, Littleton; Roger L. Wiselogle, Denver; Rodney A. Henderson, Johnstown; Kurt Pflock, Loveland, all of Colo.

[73] Assignee: Wright & McGill Co., Denver, Colo.

[21] Appl. No.: 09/207,444

[22] Filed: Dec. 8, 1998

Related U.S. Application Data

[63] Continuation-in-part of application No. 08/859,041, May 20, 1997, abandoned.

[51] Int. Cl.[7] ................................................. A01K 83/00
[52] U.S. Cl. ............................................. 43/43.6; 43/42.4
[58] Field of Search ................... 43/43.16, 43.2, 43/43.4, 43.6, 42.41, 42.42, 42.43

[56] References Cited

U.S. PATENT DOCUMENTS

| | | | |
|---|---|---|---|
| 2,185,507 | 1/1940 | Knapp | 43/38 |
| 2,651,134 | 9/1953 | Kemmerer | 43/43.4 |
| 2,735,210 | 2/1956 | Hinkal | 43/43.6 |
| 2,948,985 | 8/1960 | Kizer | 43/43.4 |
| 3,274,726 | 9/1966 | Oney | 43/43.4 |
| 3,430,378 | 3/1969 | Sweeney | 43/43.6 |
| 3,640,014 | 2/1972 | Gurka | 43/42.43 |
| 4,796,378 | 1/1989 | Krueger et al. | 43/43.2 |
| 4,932,153 | 6/1990 | Paluzzi | 43/43.4 |

*Primary Examiner*—Thomas Price
*Attorney, Agent, or Firm*—Sheridan Ross P.C.

[57] ABSTRACT

A fishing assembly for reducing entanglements between one or more fish hooks and weeds found in the body of water where fish are attempted to be caught is provided. The fishing assembly includes a single fish hook or a number of fish hooks, such as a treble hook, and a weed guard device. The weed guard device includes at least a first leg member and, in the case of a treble fish hook, three leg members. In one embodiment, each leg member has an attachment section and a guard section having an opening. Each leg member is connected to a center member having a slot. Securing material, such as an epoxy or other adhesive, affixes the center member to the fish hook adjacent to its eyelet. The guard section including opening is bent to form an upper portion and a lower portion, with the hook tip being positioned through the lower portion and adjacent to the upper portion. In another embodiment, the guard section has a crease with two side walls for receiving the hook tip. In yet another embodiment, the guard section is spoon-shaped having a smooth and continuous convex bottom surface. When the fish strikes the fishing assembly, the leg member or leg members readily move inwardly to expose the fish hook or hooks to engage or catch the fish.

12 Claims, 10 Drawing Sheets

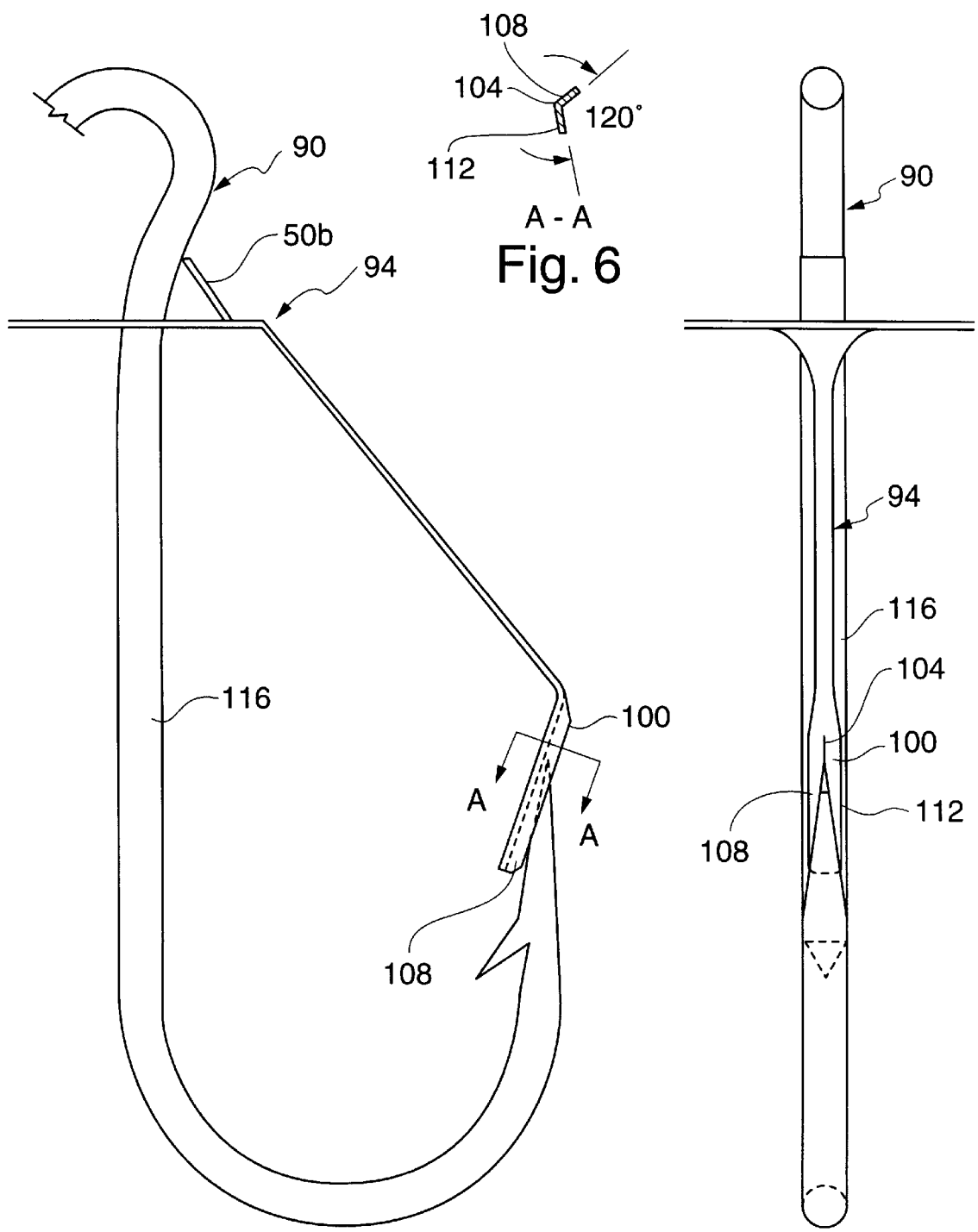

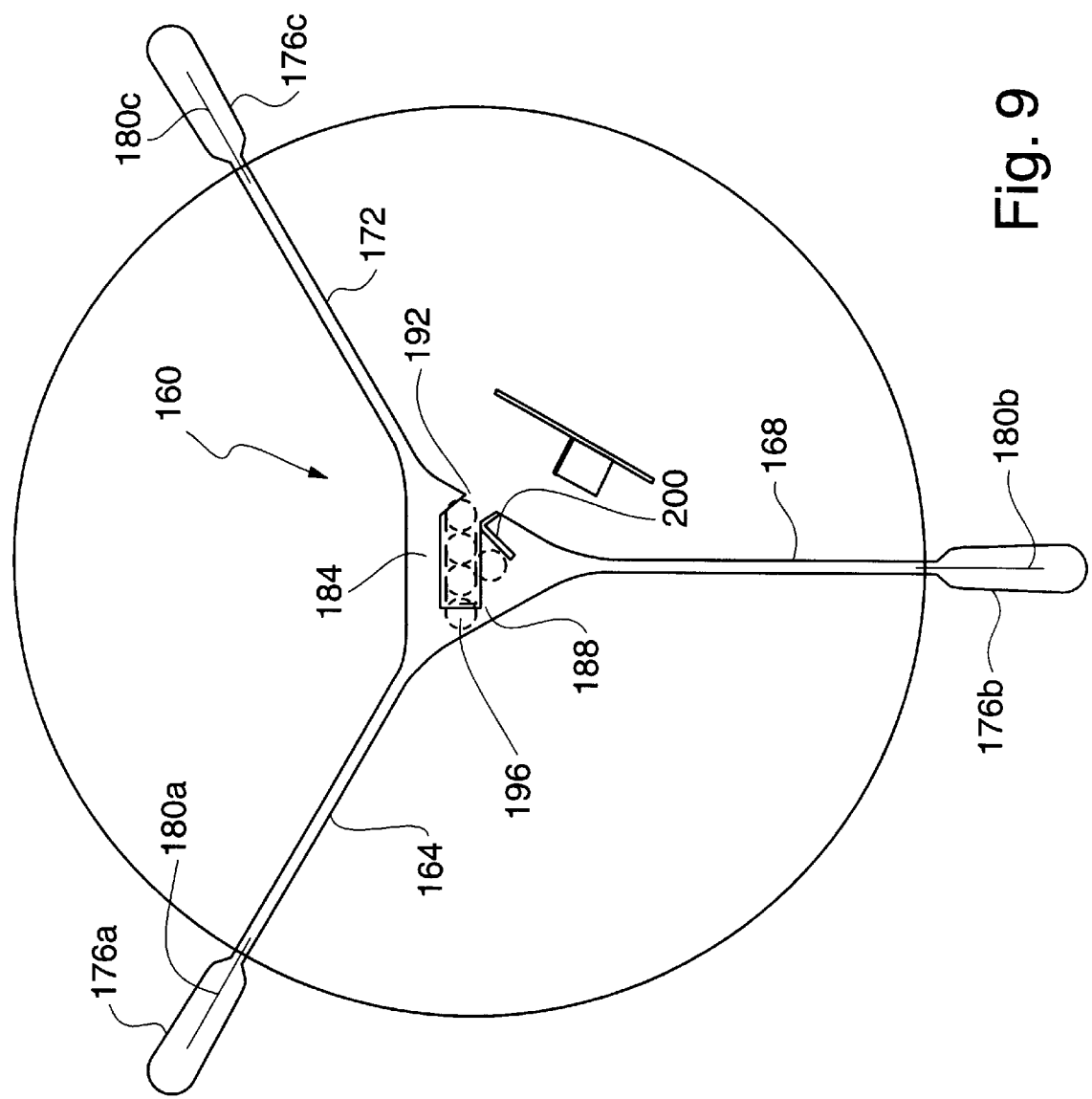

FISH HOOK AND WEED GUARD DEVICE

This is a continuation-in-part of Ser. No. 08/859,041 filed May 20, 1997, now abanoned.

FIELD OF THE INVENTION

The present invention relates to a combination of a fish hook and a weed guard device that is provided to avoid entanglements between the fish hook and weeds.

BACKGROUND OF THE INVENTION

The habitat of certain fish includes bodies of water that are populated with weeds or other growth. When fishing, using one or more fish hooks, a fish hook can become entangled in the weeds. This makes it difficult to catch fish or move the hook through the weeds. The fish hook can be so entangled that the fishing line breaks or must be broken in order to retrieve the fishing line, which results in a loss of the fish hook and part of the fishing line.

The problem of encountering weeds during fishing has been addressed in a number of patents. Numerous solutions have been advanced over the years. It is known to connect a weed guard to the fish hook or hooks for the purpose of preventing the fish hook from being caught in the weeds found, for example, in lakes or ponds. The weed guard is also movable so that, when a fish strikes, the weed guard is moved relative to the fish hook or hooks. Once moved out of the way, one or more of the fish hooks become embedded in the fish.

Although the prior art has generally satisfied these two main objectives in connection with employing a weed guard, it would nevertheless be advantageous to provide a combination fish hook and weed guard device that better meets all desired features associated with such a fishing assembly.

SUMMARY OF THE INVENTION

In accordance with the present invention, a fishing assembly is provided that includes one or more fish hooks and a weed guard device. In one embodiment, the fish hook is a conventional design in that it includes an eyelet for receiving fishing line, a shank that extends from the eyelet, a hook section with a hook tip for engaging or hooking the fish, and usually a barb integral with the hook section. In one particular embodiment, a treble hook configuration is utilized having essentially three fish hooks that are joined together. In another embodiment, the fish hook has a novel hook tip construction.

The weed guard device of the fishing assembly includes a center member having a slot. At each of the opposite ends of the slot, a tab or anchor member extends from the center member. The slot is sized or dimensioned to adequately receive the eyelet of the fish hook. Integrally formed with and extending from a periphery of the central member is at least a first leg member. The first leg member includes an extension or attachment section and a guard section. In one embodiment, the guard section includes an elongated opening or loop. The guard section including opening is substantially wider than the attachment section. The width of the attachment section is also substantially less than the width of the center member, with the width of the attachment section being no greater than one-fourth that of the center member. This dimensional attribute is intended to enhance the hydrodynamic characteristics of the fishing assembly including a positive effect on the drag coefficient. That is, it is desirable to avoid any unwanted change to how the fish hook moves through the water due to the addition of the weed guard device. In other related embodiments, a number of leg members are part of the weed guard device and are integrally formed with the center member. For example, when the weed guard device is used with a treble hook, three leg members are integrally formed with the center member. Such leg members radially extend from the center member and are typically spaced equi-distant from each other.

In making the fishing assembly, the eyelet of the fish hook is inserted through the slot in the center member. The anchor members extend in a direction towards the eyelet. A securing or bonding material, such as an epoxy or other adhesive, is applied to the center member that is located at the base of the eyelet. The eyelet extends from one side of the center member, while remaining portions of the fish hook extend from the bottom side of the center member. The securing material fills or substantially fills the slot after the eyelet has been inserted such that a mound is created just high enough to cover or substantially cover tabs of the center member. The securing material affixes the weed guard device to the fish hook and prevents the weed guard device from rotating or moving relative to the fish hook. With respect to locating a first leg member and any other leg member relative to the fish hook, the first leg member is made of a malleable material that enables it to be bent downwardly in a direction away from the eyelet, with the bend being made at the point or area where the attachment section is joined to the center member. When the first leg member is bent, the guard section is located adjacent to the hook tip. The leg members are also made of a resilient material in order to function properly without permanent deformation, particularly related to releasing and guarding fish hook tips whenever appropriate. Material selection (e.g. spring temper) and geometry (thickness, width and shape) of the weed guard device are important in its performance.

With regard to creating a guard against weed entanglements, in one embodiment, the guard section is bent to define an upper portion and a lower portion of the guard section. The upper portion is that portion joined to the attachment section. The lower portion extends from the upper potion. The hook tip or point is contained within the circumference of the portion of the weed guard device immediately above such hook tip. Preferably, the hook tip is within the circumference by at least one hook wire diameter associated with the fish hook that is being used with the particular weed guard device. An angle is formed at the juncture between the upper and lower portions. Additionally, the upper portion usually has a greater length than the lower portion. For each hook of the particular fishing assembly, such assembly steps are conducted in locating the particular leg member of the weed guard device relative to the hook section, primarily the hook tip.

In another embodiment, the weed guard device includes a guard section without an opening. Instead, the guard section has a center fold or crease that defines first and second side walls. An angle is formed at the junction of these two side walls. The hook tip is positioned within the two side walls, or the valley of this V-bend, of this guard section when the device is acting as a barrier or guard against weed entanglements. In still another embodiment, the guard section is generally spoon-shaped and its convex surface is able to receive and desirably hold the fish hook tip until a fish strikes the fishing assembly. Each of these two embodiments employs a structure that assures release of the guard section relative to the hook section when a fish strikes the fishing assembly even under circumstances where the pressure or force applied by the fish is at the side of the guard section.

Stated another way, the guard section configuration properly enables the hook section to be separated from the guard section including when the fish bites the guard section at its side, instead of directly on. The designs of these other embodiments are also useful in providing initial location of the hook tips or points within the spoon-shaped or creased guard sections, which acts as a centering or guiding function.

Each of the weed guard devices of the various embodiments can also be formed with its center member slot having an open end that is closable using a closable member or a viscous material such as an adhesive. The fish hook eyelet is inserted through the open end before it is closed. This feature reduces the footprint of the center member.

When in operation or use, when the fish strikes the fishing assembly, the first leg member is caused to move more inwardly away from being inside the circumference of the portion of the weed guard device to thereby expose the fish hook, particularly the hook section and its tip. Once exposed, the fish hook engages in the mouth of the fish. Conversely, when no fish is striking the fishing assembly and the fishing assembly is located in a weedy environment, the weed guard device avoids or guards against the fish hook or hooks from becoming entangled in the weeds.

Based on the foregoing summary, a number of advantages of the present invention are readily discerned. A combination hook and weed guard device is disclosed that is relatively easy to make inasmuch as the weed guard device is stamped or otherwise formed as an integral unit having as many leg members as desired for the particular fish hook design, e.g., a treble hook or a single hook design. The overall configuration of the weed guard device facilitates assembly relative to the particular hook including establishing a fixed connection using an adhesive or bonding material. Relatedly, the leg member(s) of the weed guard device is (are) very lightweight and of a resilient, as well as malleable, construction for use in suitably positioning the leg member(s) relative to the hook(s). Furthermore, the structure and assembling of the weed guard device to the fish hook results in a relatively inexpensive fishing assembly. The fishing assembly also rapidly exposes the hook section and hook tip when the fish grabs or bites the fishing assembly in order to catch the fish, while preventing or reducing any entanglements that might occur when the fishing assembly moves through or is positioned in weeds or other growth that might be found in the habitat of the fish. Another aspect involves a smaller center member footprint through the use of a closable slot, with the smaller footprint enhancing hydrodynamic characteristics of the weed guard device. Additionally, different embodiments of the guard section have been devised that permit release of the hook section when a fish strikes the guard section essentially from its side.

Additional advantages of the present invention will become readily apparent from the following discussion, particularly when taken together with the accompanying drawings.

BRIEF DESCRIPTION OF THE DRAWINGS

FIG. 4 is a side elevational view of enlarged portions of another embodiment of a fishing assembly in which the guard section of the weed guard device has a center fold and in which the hook tip of the fish hook unit is held between two side walls of the guard section;

FIG. 5 is a front elevational view of the embodiment of FIG. 4;

FIG. 6 is a lateral section of the guard section of FIG. 4 illustrating the substantially V-shaped cross-section;

FIG. 9 illustrates another embodiment of a weed guard device in which the center member is substantially triangular-shaped and the slot is closable at an end thereof after receipt of the fish hook eyelet;

DETAILED DESCRIPTION

Figure 1:
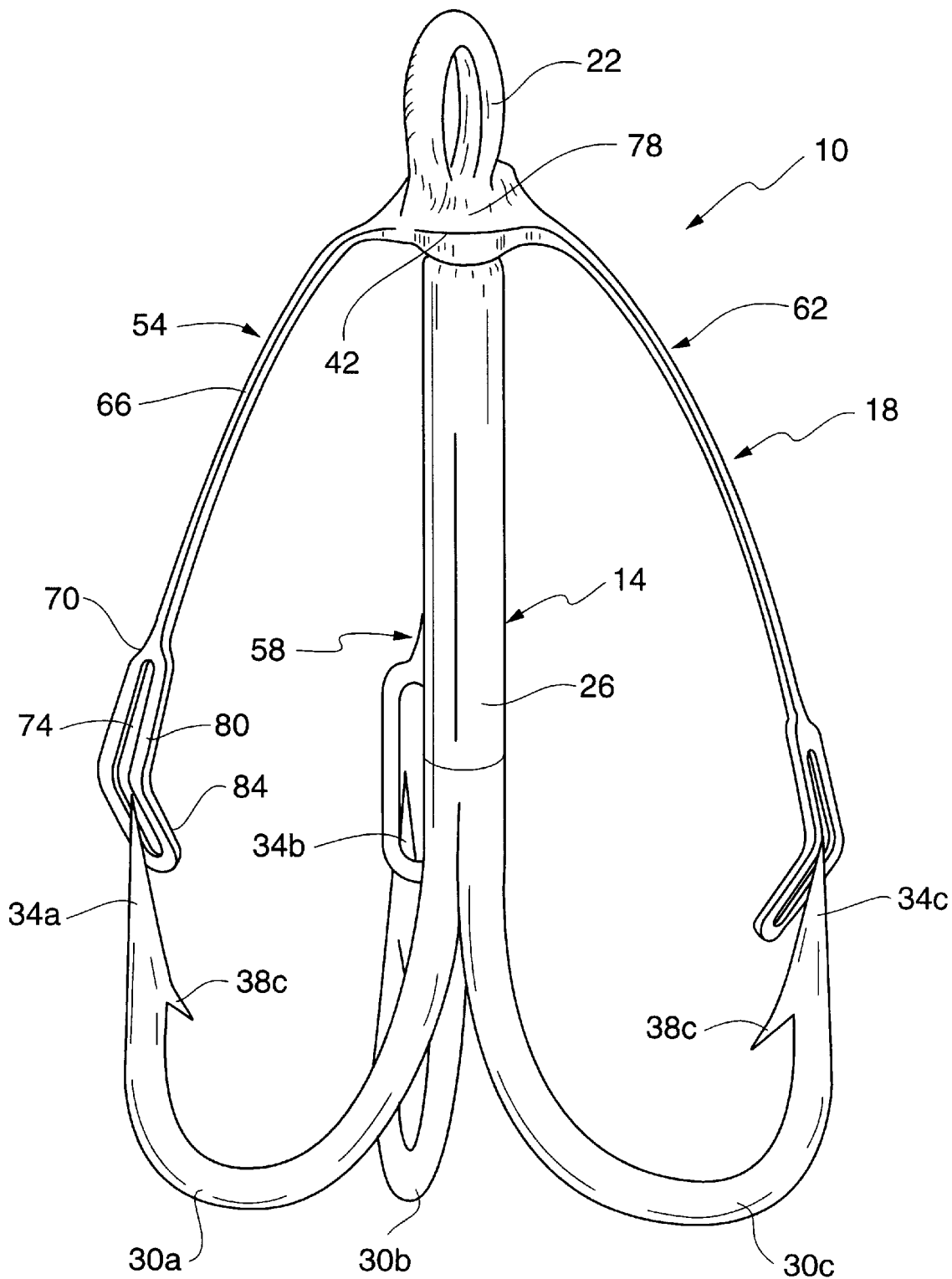
FIG. 1 is a perspective view illustrating the combination of treble fish hook and weed guard device.

With reference to FIG. 1, a fishing assembly 10 is illustrated that includes a fish hook unit 14 and a weed guard device 18. The weed guard device 18 prevents or reduces the possibilities that the fish hook unit 14 will be caught in weeds or other growth commonly found in bodies of water where fishing occurs, such as bass fishing. When positioned or being moved through such weeds, the weed guard device 18 does not permit the fish hook unit 14, particularly the hook tips thereof, to be entangled in the weeds since the weed guard device 18 acts as a guard or barrier against unwanted engagement and entanglements.

Figure 2:
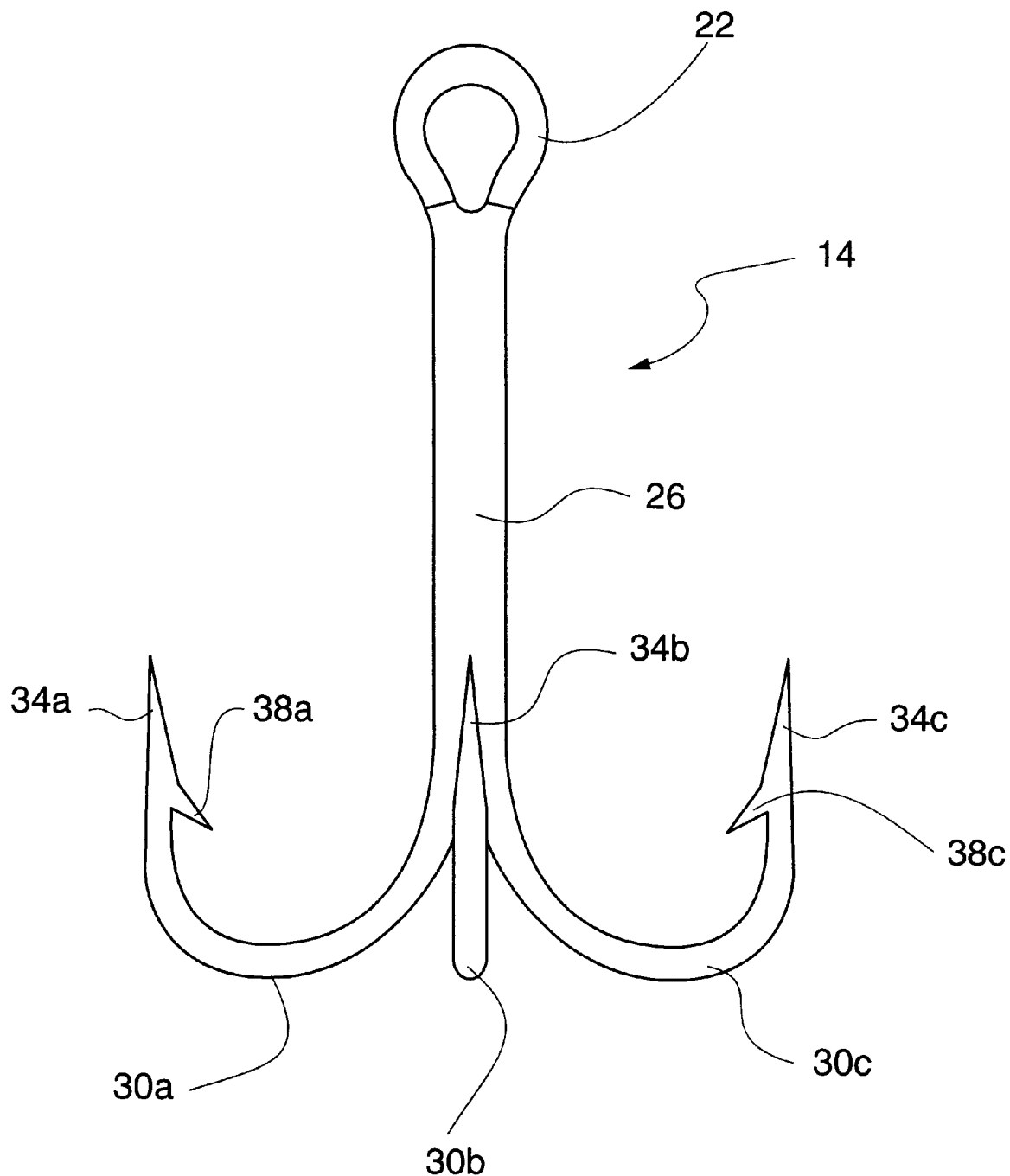
FIG. 2 illustrates a conventional treble fish hook useful as part of the combination of the present invention.

Referring to FIG. 2, the particular fish hook unit 14 of FIG. 1 is illustrated by itself and this disclosed embodiment is a conventional treble hook characterized by having three hooks, each of which is capable of engaging the fish, particularly the fish's mouth. It should be appreciated that other fish hook units 14 could be employed as part of the present invention including designs that comprise double hooks or a single hook. The fish hook unit 14 of FIG. 2 includes an eyelet 22 for receiving fishing line. A shank 26 is integral with the eyelet and extends a desired length to where three hook sections 30a, 30b, 30b emanate or diverge from the shank 26. Each of the hook sections 30a,30b,30c terminates in a sharp hook tip 34a,34b,34c, respectively. Adjacent each of the hook tips 34a,34b,34c is a barb, with barbs 38a, 38c being shown, although the weed guard device can also be used with barbless hooks. When the fish bites or strikes the fish hook unit 14, one or more of the fish hook tips 34a–34c engage or pierce portions of the mouth of the fish.

Figure 3:
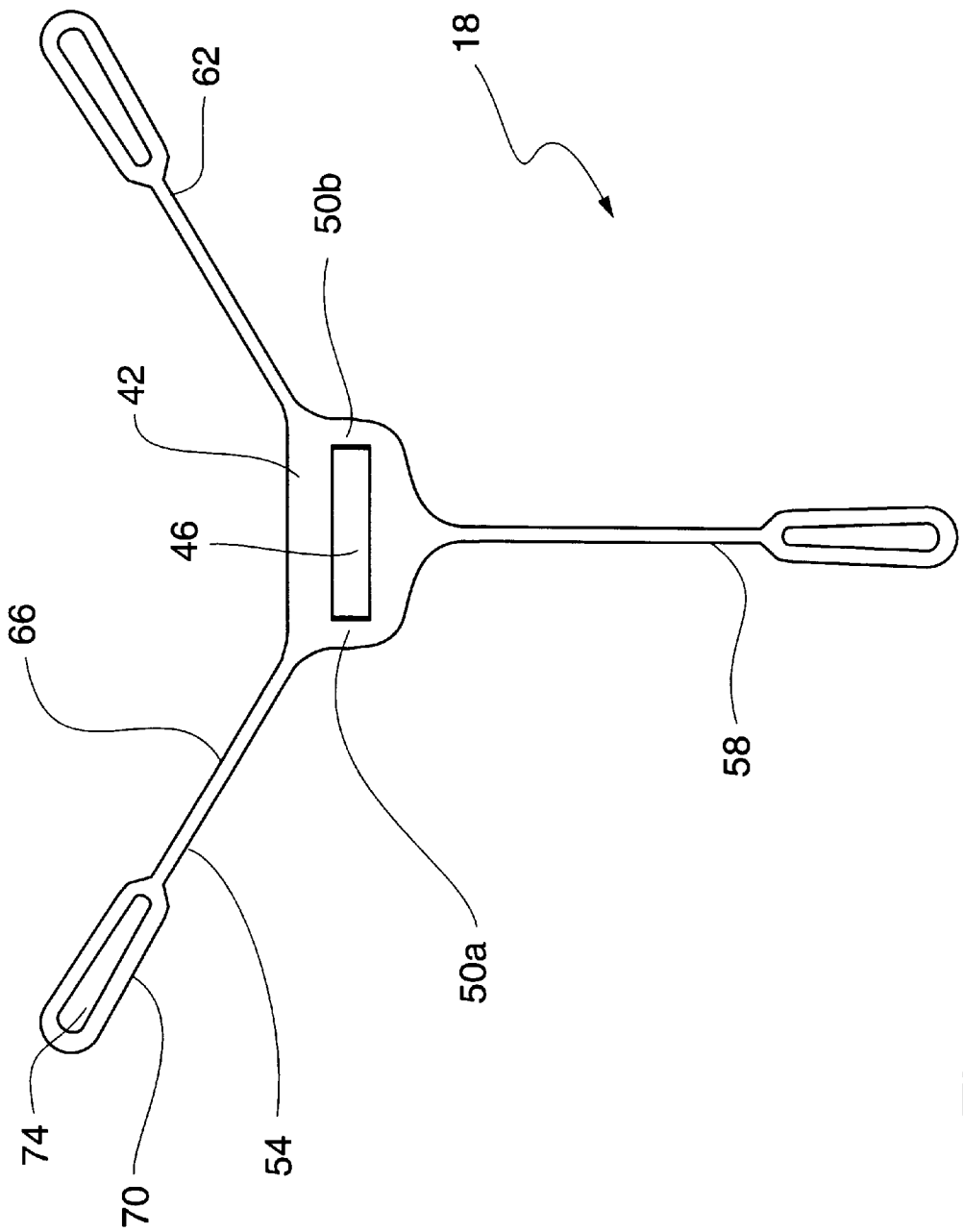
FIG. 3 illustrates the weed guard device of FIG. 1 prior to being joined and before being bent relative to the treble fish hook.

In FIG. 3, the weed guard device 18 is illustrated before assembly or connection to the fish hook unit 14. The weed guard device 18 includes a center member 42 having an elongated slot 46 dimensioned or of a size through which the eyelet 22 of the fish hook unit 14 can be received. At opposite ends of the slot 46 tabs or anchor members 50a,50b extend from the plane of the body of the center member 42. Each anchor member 50 is formed or cut when the slot 46 is created in the center member 42 and are useful in centering the weed guard device 18 on the fish hook unit 14, as well as providing anchors for securing material, which will be described later herein. In the embodiment of FIG. 1 in which a weed guard device 18 is used with a fish hook unit 14 that is a treble hook, there are three leg members 54,58,62 that are structurally equivalent to each other, but with each of them being located along different peripheral areas or points of the center member 42. That is, the center member illustrated in FIG. 2 can be characterized as including a substantially rectangular section and a substantially triangular section, although another embodiment described later herein is solely substantially triangular in shape. The leg members 54,62 are integrally formed at opposite side corners of the rectangular section and the third leg 58 is integrally formed with the center member 42 at the apex of the triangular section of the center member 42.

The structure of the leg member 54 will be described in detail with the understanding that the other two leg members 58,62 have equivalent structure. The leg member 54 includes an attachment section 66 and a guard section 70. The guard section 70 has an elongated opening or loop 74 bounded by body portions of the guard section 70. The length of the attachment section 66 extends a desired distance from the center member 42, with the guard section 70 being integral therewith and having a free end that terminates the leg member 54. In a preferred embodiment, the length of the attachment section 66 is longer than the length of the guard section 54 that continues the length of the leg member 54.

The center member 42 has a width associated with the rectangular section thereof that extends in a direction between the leg members 54,62 and the leg member 58. A width of the center member 42 is also defined by the combination of the widths of the rectangular section and the triangular section. Preferably, the width of the rectangular section of the center member 42 is substantially greater than the width of the attachment section 66, with such width being at least four times greater than the width of the attachment section 66. Likewise, the width of the guard section 70 including the opening 74 and the body portions of the guard section 70 that bound the opening 74 is substantially greater than the width of the attachment 66, such as being at least three times greater. Such dimensions and their relationships with each other are useful in providing an easily made, relatively inexpensive and malleable device for use with a fish hook unit 14.

Referring to FIGS. 4–6, another embodiment of a fishing assembly is next described. As seen in FIG. 4, a fish hook unit 90 illustrated with a single fish hook is joined to a weed guard device 94 that differs from the previous embodiment in the configuration of a guard section 100. The guard section 100 does not include an opening or loop. Rather, a center fold or crease 104 is formed to define side walls 108, 112, which come together at the crease 104 and define an angle. The hook tip 116 of the fish hook unit 90 has at least some portions that are located or contained within the guard section 100 between the first and second side walls 108,112. Preferably, the angle defined by the two side walls at the juncture defined by the crease 104 is at least 90° and no greater than 150°. More preferably, this angle is about 120°. Additionally, the height of each of the two walls 108, 112 is no greater than one wire diameter of the fish hook and preferably in the range of ½ to same as wire diameter. With the guard section having these dimensional constraints, release of the fish hook from the guard section 100 is properly achieved when a fish strikes the fishing assembly. More particularly, even when a side pressure or force due to the fish striking the guard section 100 primarily at its side is present, proper release of the guard section 100 from the fish hook occurs. The width of the guard section 100 is essentially no greater than three times that of the fish hook wire diameter and preferably in the range of 1–3 times that of the wire diameter when the guard section 100 has the crease 104 to provide the V-shaped cross-section.

Figures 7, 8:
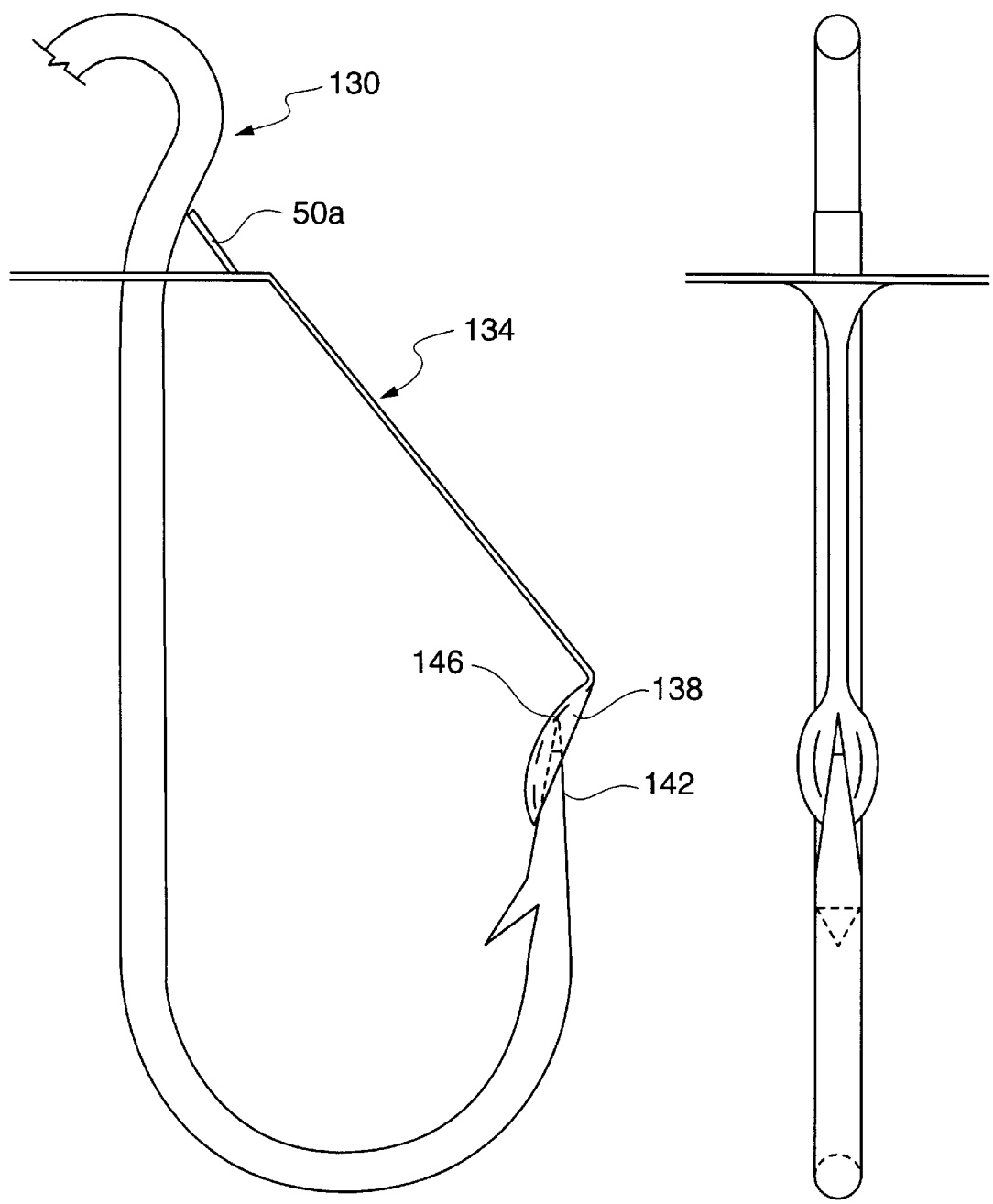
FIG. 7 is a side elevational view of still another embodiment of a fishing assembly in which the weed guard device has a guard section that is substantially spoon-shaped.
FIG. 8 is a front elevational view of the embodiment of FIG. 7.

With reference to FIGS. 7 and 8, yet another embodiment of a fishing assembly is disclosed. This fishing assembly includes a fish hook unit 130 and a weed guard device 134. The weed guard device 134 is characterized by a guard section 138 that is substantially spoon-shaped for receiving at least some portion of the hook tip 142 of the fish hook unit 130. When the weed guard device 134 is acting as a guard against weed or other growth entanglements, the hook tip 142 is properly held at the convex bottom surface 146 of the guard section 138. This bottom surface 146 is smooth, continuous and free of any abrupt discontinuities along its surface. Like the embodiment of the guard section 100, the guard section 138 including the bottom surface 146 has a design and dimensions that enable it to be properly released from the hook tip 142 when a fish strikes the fishing assembly.

A further embodiment of a weed guard device 160 is illustrated in FIG. 9. This configuration of a weed guard device is based on that disclosed in FIGS. 4–6 as related to the leg members 164,168,172. Each of these leg members 164,168,172 has a guard section 176a,176b,176c, respectively, with a crease 180a, 180b, 180c formed therein. The weed guard device 160 is particularly characterized by a substantially triangular-shaped center member 184 having a slot 188, with a closable end 192. At the opposite end of the slot 188 from the closable end 192, an anchor member 196 is formed. A closable member or movable tab 200 is formed at the closable end 192. The closable member 200 can be changed in position so that it closes off the closable end 192 after an eyelet of a fish hook or hooks has been received in the slot 188 through the closable end 192. In that regard, the dimensions or size of the slot 188 is relatively smaller than the slot 46 of the embodiments of FIGS. 1–3. Consequently, the center member 184 is relatively smaller and can be formed in the triangular-shape illustrated in FIG. 9. That is, a relatively smaller slot 184 can be utilized since the eyelet of the fish hook need not be inserted directly the slot 184, rather it is inserted from the side through the closable end 192. This configuration enhances the hydrodynamic characteristics of the weed guard device 160 due to its smaller size and shape. After the eyelet of the fish hook is desirably positioned within the slot 184, the closable member 200 is moved or folded to close off the closable end 192, prior to use of an adhesive or viscous material that is used in fixedly holding the weed guard device 160 to the fish hook adjacent to the base of the eyelet. Relatedly, instead of the closable member 200, the end of the slot 184 that is open to receive the eyelet can be covered or at least partially filled with the viscous material after the eyelet has been inserted.

Figure 10:
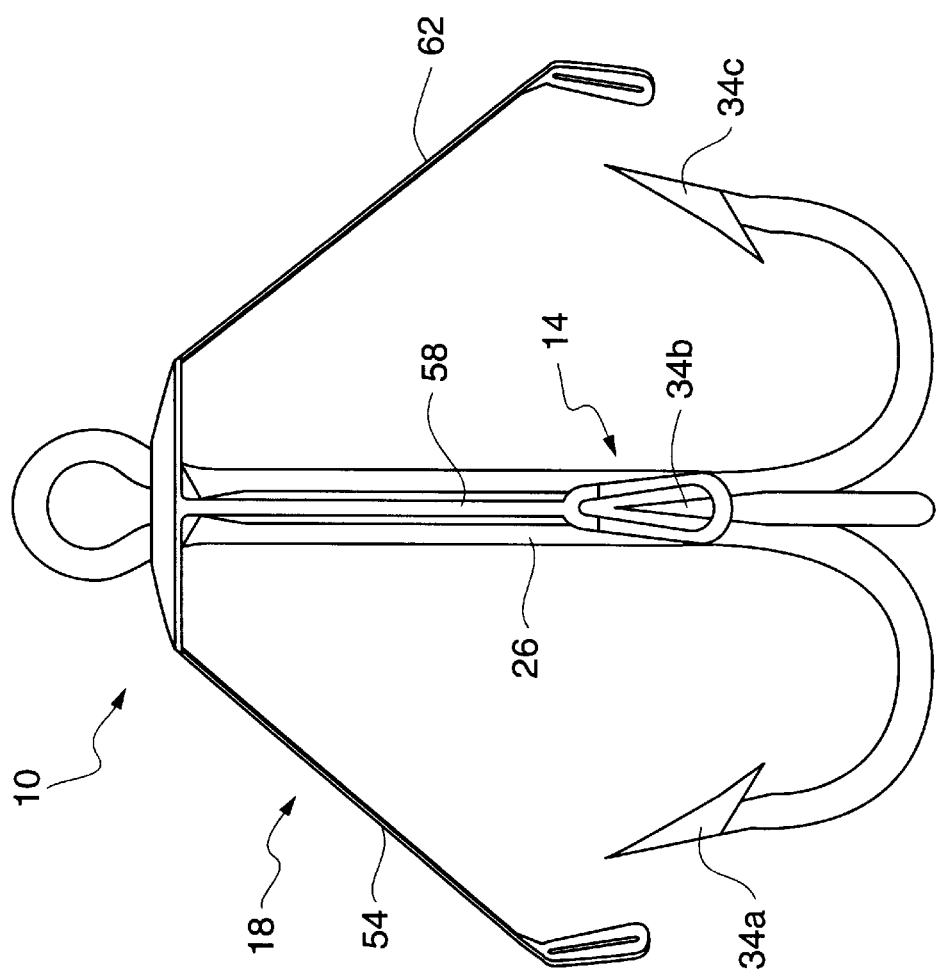
FIG. 10 illustrates an embodiment of a fish hook for use with a weed guard device having an angled hook tip section.

Referring to FIG. 10, the geometry of a treble fish hook unit 14 for use with a weed guard device 18 is preferably based on a long shank hook design and close proximity of the sharp hook tips 34a,34b,34c to the weed guard device 18. The long shank hook design reduces the angle between the weed guard leg members 54,58,62 and the hook shank 26, which enhances the flow characteristics of the fishing assembly 10 by reducing the turbulence caused by the weed guard device 18. One such long shank hook design is referred to as an "O'Shaughnessy" hook. This reduced angle also reduces the amount of weed guard leg member deflection that is necessary to expose the sharp hook tips 34a,34b, 34c, thus increasing the likelihood of hooking the fish.

Figure 11:
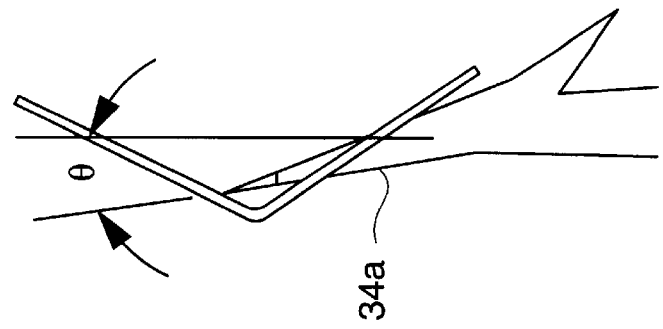
FIG. 11 is an enlarged, fragmentary view of the angled hook tip section of FIG. 10.

FIG. 10 also illustrates a fish hook unit 14 wherein each sharp hook tip 34a,34b,34c is angled outward from the shank 26. As shown in more detail in FIG. 11, the sharp hook tip 34a is angled outward from the shank 26 by an angle θ, recognizing that the other sharp hook tips 34b, 34c preferably are similarly angled from the shank 26. Preferably, the angle θ is between 4° and 10°. Most preferably, one would modify an "O'Shaughnessy" hook design to incorporate this angle θ. The outward angle θ positions each sharp hook tip 34a,34b,34c to emerge from under the weed guard device 18 with less deflection of the weed guard leg and to more readily hook the fish. In a weed guard fish hook design, a fish may feel the resistance of the weed guard device 18 and release the hook before being properly hooked. By reducing the resistance of the weed guard device 18 and by more readily exposing each sharp hook tip 34a,34b,34c, the fishing assembly 10 increases the likelihood of hooking a fish.

With reference to FIGS. 1 and 12–15, the assembly of and connection between the fish hook unit 14 and the weed guard device 18 to form the fishing assembly 10 are next described. As a general overview directed to producing a combination of a fish hook unit 14 and a weed guard device 18, the eyelet 22 of the fish hook unit 14 is inserted through the slot 46 in the center member 42 and is held at the base or adjacent to the eyelet 22. Once in place in this position, the weed guard device 18 is securely affixed to the fish hook unit 14 by means of a securing or bonding material 78, such as an epoxy or adhesive based material. Preferably, the securing material 78 fills the slot 46 and surrounds the fish hook unit 14 portion at the base of the eyelet 22. This prevents unwanted movement or rotation of the weed guard device 18 relative to the fish hook unit 14 and fixedly holds it permanently in place. Preferably, the weed guard device 18 is fixed securely to the fish hook unit 14, thereby maintaining the proper positioning of the distal ends of the weed guard device 18 with respect to each sharp hook tip 34a,34b,34c and each hook barb 38a,38b,38c.

In positioning the leg members 54,58,62 relative to the respective one of the hook sections 30a,30b,30c, each of the leg members 54,58,62 is manipulated or adjusted. Since each of the resulting constructions of the leg members 54,58,62 relative to the hook sections 30a,30b,30b is equivalent, only one such construction or assembly need be described inasmuch as the description applies to all such leg members and their respective or corresponding hook sections. In that regard, the leg member 54 is bent adjacent to the juncture of the attachment section 66 and corner of the center member 42. The amount or angle of this bend is suitable for properly locating the guard section 70 relative to the hook section 30a, particularly the hook tip 34a thereof.

In addition to the afore-noted bend at the junction with the center member 42, the guard section 70 itself is also bent including the opening 74 thereof. With reference to FIG. 1, after bending, an upper portion 80 and a lower portion 84 of the guard section 70 are defined. The upper portion 80 is that part of the guard section 70 that is integral with the attachment section 66, while the lower portion 84 constitutes the remaining part of the guard section 70. The bend that creates the upper and lower portions 80, 84 is typically a relatively sharp bend that creates an angle defined by the junction between these two portions 80, 84. The thin and lightweight construction, as well as the composition of the material of the leg members 54–62, facilitates making the bends and forming the upper portions and the lower portions of the guard sections.

As also seen in FIG. 1, the hook tip 34a is located through the lower portion 84 and the hook tip 34a, as well as the other hook tips or points, is contained within the circumference of the portion defined by the guard section immediately above the hook tip 34a. Preferably, the hook tip is within that circumference by 1–2 hook wire diameters. Hence, the hook tip 34a is readily positioned to be exposed past the guard section 70 when desired.

Figure 12:
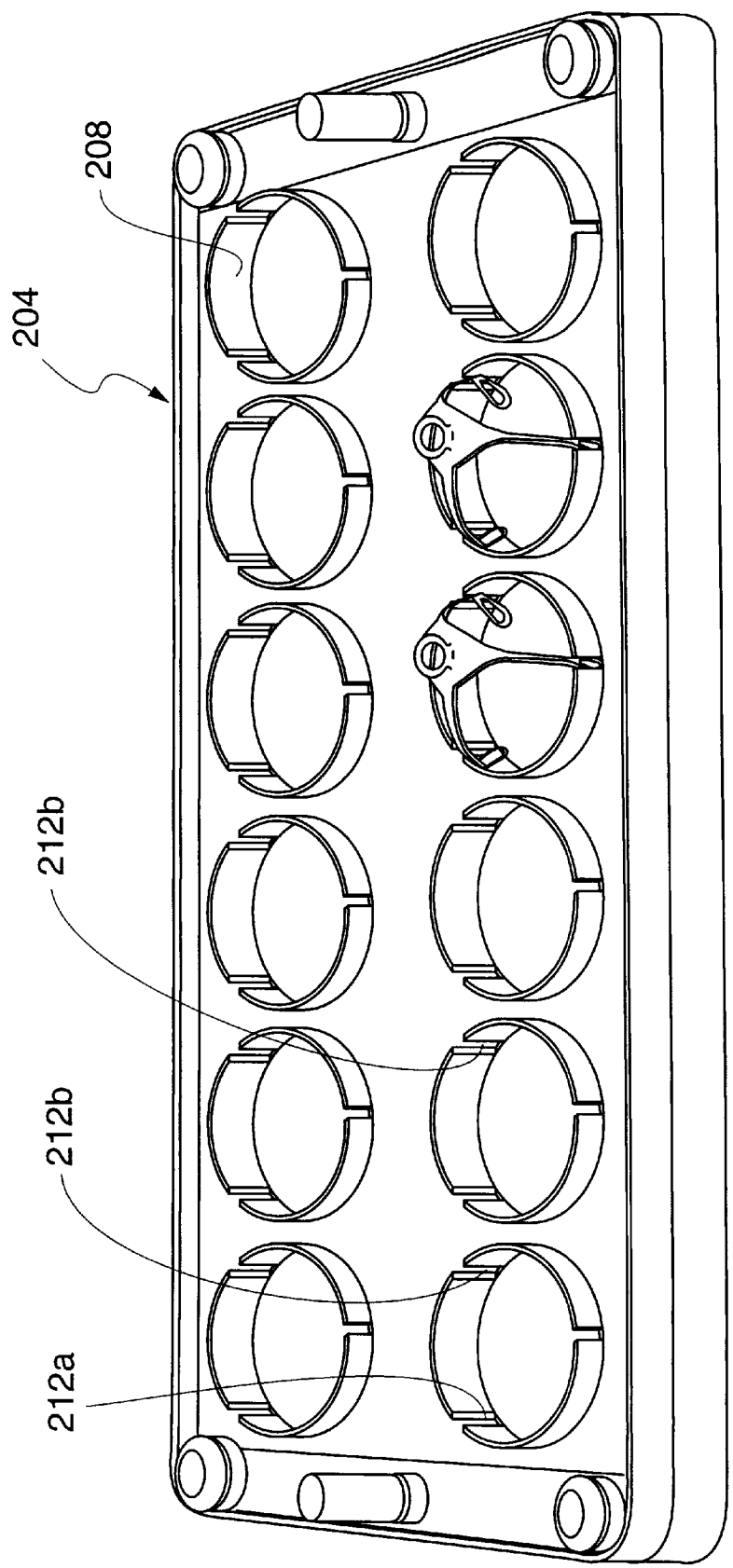
FIG. 12 is a perspective view illustrating a pallet having a number of wells for receiving a combination of a treble fish hook and a weed guard device for use in aligning them for subsequent bonding them together.

Now referring to FIG. 12, the fish hook unit 14 and the weed guard device 18 are placed in a pallet 204. Preferably, the pallet 204 contains a plurality of wells 208, each of which are designed to house a combination of one fish hook unit 14 and one weed guard device 18. Most preferably, the pallet is generally rectangular and contains twelve such wells 208, arranged in two longitudinal rows of six wells per row. The well 208 preferably is circular, with a vertical wall 210 extending up from the pallet 204 and above the hook tips 34a,34b,34c and most preferably above the guard section 70 of the weed guard device 18. The pallet well 208 is designed to assist in properly aligning the fishing assembly 10 during the bonding and curing operations.

One fish hook unit 14 and one weed guard device 18 are placed into each well 208, with each eyelet 22 aligned along the longitudinal axis of the pallet 204. To assist in proper and consistent alignment of the fish hook unit 14 and weed guard device 18 within the well 208, one or more slits 212a,212b are formed within the well 208 for receiving and holding portions of the fishing assembly 10.

Figure 13:
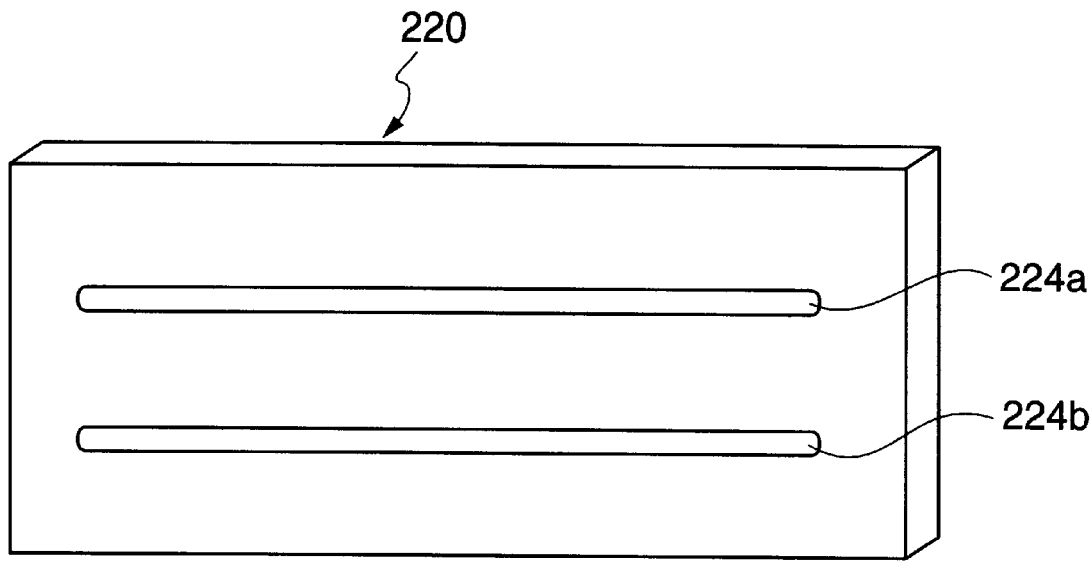
FIG. 13 is a perspective view illustrating an alignment tool for aligning eyelets of a number of fish hooks held in the pallet.

As an aid for proper and consistent alignment, and now referring to FIG. 13, an alignment tool 220 may be used. After all fish hook units 14 and accompanying weed guard devices 18 are placed into the wells 208 of a row of the pallet 204, an alignment tool 220 is placed over the pallet 204. When properly aligned along the length of the pallet 204, the eyelets 22 of the fish hook unit 14 extend through part or all of the slots 224a,224b and the alignment tool 220 rests upon the top of the wells 208. The alignment tool 220 is then removed. Such alignment is essential in properly locating the eyelets 22 for later receiving the bonding material.

Figure 15:
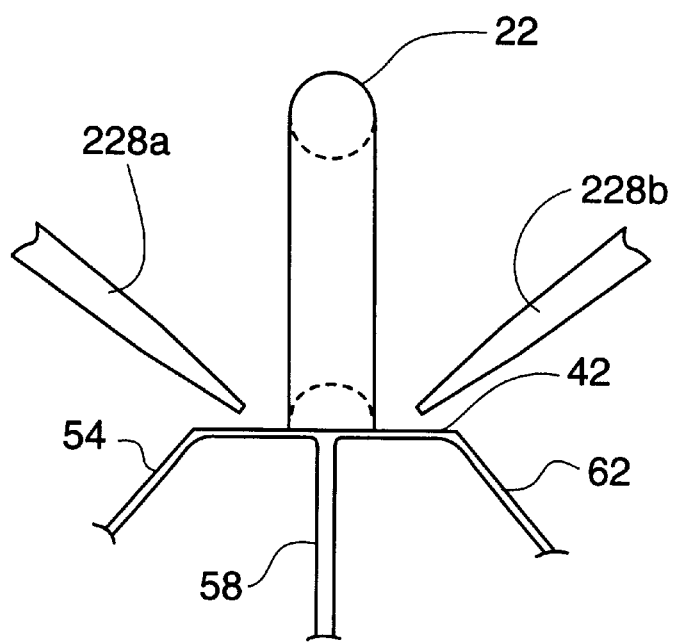
FIG. 15 schematically illustrates application of an adhesive to fixedly join together the fish hook and the weed guard device using a pair of adhesive injector elements or nozzles.
Figure 14:
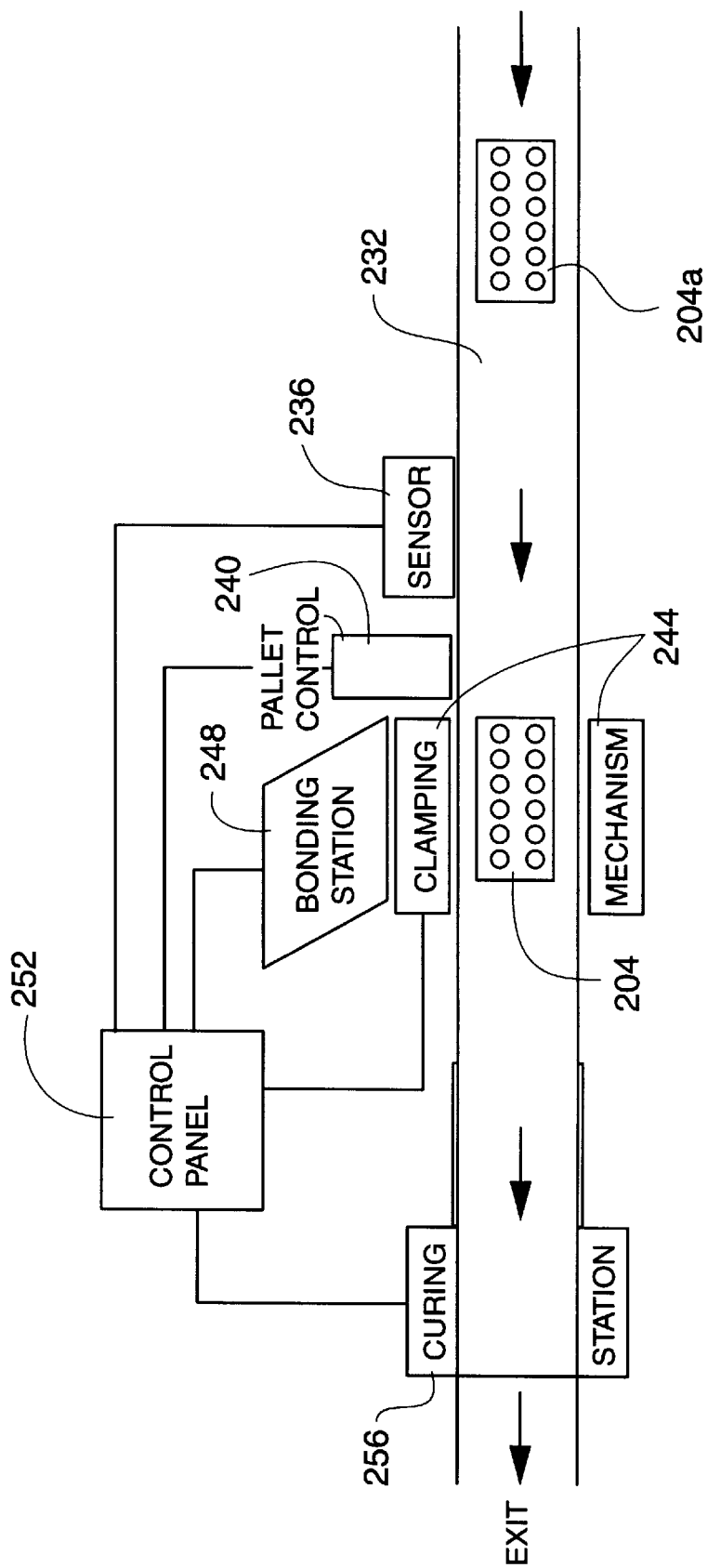
FIG. 14 schematically illustrates a system for fixedly connecting together the combination of a fish hook and a weed guard device using a bonding material or adhesive.

Referring now to FIGS. 1, 14 and 15, the pallet 204 is placed onto a conveyor 232, which moves the pallet 204 towards a bonding station 248 for application of the bonding material 78. At least one injector element 228a is positioned next to eyelet 22 and center member 42. The injector element 228a includes at least one outlet port 230a, which is preferably positioned at an oblique angle relative to the eyelet 22. More preferably, two injector elements 228a,228b are employed, one on either side of the center member 42. The injector element 228a injects a portion of the bonding material 78 from the outlet port 230a on one portion of the weed guard device 18, while at substantially the same time the injector element 228b injects a second portion of the bonding material 78 on a second portion of the weed guard device 18. In the embodiment having two rows of six wells each, twelve injector elements 228 are used to simultaneously apply the bonding material 78 to the six combinations of fish hook units 14 and weed guard devices 18. After one row of the two row platform is finished, the injector elements 228 are moved, under control of the control panel 252, to be suitably positioned relative to the other of the two rows. The bonding material 78 can then be simultaneously injected to contact the second set of six fish hook units 14 and weed guard devices 18.

Most preferably, the conveyor 232 does not stop during application of the bonding material 78. As the conveyor 232 moves the pallet 204 towards the bonding station 248, a sensor 236 determines the presence of the pallet 204 and inputs a signal to a control panel 252 informing it of the pallet's presence. The control panel 252 instructs a clamping mechanism 244 to clamp onto the pallet 204 and raise the pallet 204 a predetermined distance above the still moving conveyor 232. Preferably, the pallet 204 includes a plurality of clamping connectors 216, preferably two on each side. The clamping connectors 216 of the pallet 204 are matched to connectors on the clamping mechanism 244 to securely hold the pallet 204 above the conveyor 232 at the bonding station 248 during application of the bonding material 78.

Referring to FIG. 14, during the time at which the pallet 204 is at the bonding station 248, one or more additional pallet 204*a* may be placed onto the conveyor 232 and may be moving towards the bonding station 248. The sensor 236 identifies the presence of the additional pallet 204*a* for the control panel 252, which instructs a pallet control 240 to stop the forward movement of the additional pallet 204*a* until the pallet 204 is removed from the bonding station 248. Preferably, the pallet control 240 includes an arm that is extendable across at least portions of the width of the conveyor 232 to temporarily prevent the additional pallet 204*a* from entering the bonding station 248, while allowing the conveyor 232 to continue to move. After the clamping mechanism 244 releases the pallet 204, the control panel 252 instructs the pallet control 240 to allow the next pallet 204*a* waiting in line to proceed to the bonding station 248.

After the clamping mechanism 224 releases the pallet 204, the conveyor 232 moves the pallet 204 towards and through a curing station 256 to cure or harden the bonding material 78. Preferably, the pallet 204 enters the curing station 256 within less than about 30 seconds after application of the bonding material 78. This reduces the likelihood of the bonding material 78 running and of the weed guard device 18 being misaligned from the desired position on the fish hook unit 14. Preferably, the curing station 256 employs ultraviolet radiation to cure the bonding material 78 within less than about 30 seconds, while the loaded pallet 204 is stationary inside of the curing station 256, since the conveyor 232 is stopped (not moving) while the platform 204 is disposed within the curing station 256 and the bonding material 78 is exposed to ultraviolet radiation. After such ultraviolet radiation, the conveyor 232 is then caused to move, under control of the control panel 252 and the pallet 204 is conveyed away from the curing station 256. The fishing assemblies 10 are then removed from the pallet 204 for further processing, such as inspecting and packaging. In that regard, shortly after exiting the curing station 256, an inspector can inspect each of the fishing assemblies 10 to check whether they meet quality requirements, particularly related to proper connection between each fish hook unit 14 and its accompanying weed guard device 18. As part of the inspection procedure, the inspector removes the fishing assemblies 10 from the pallet 204. The empty pallet 204 can then be returned for subsequent loading of more combinations of fish hook units 14 and weed guard devices 18. A return conveyor is utilized to carry the empty pallets 204 to the assemblers, who are performing the tasks related to properly positioning the combinations of fish hook units 14 and weed guard devices 18 into the wells 208 of the pallets 204. Each assembler has a work station at which such assembling occurs. The return conveyor carries the empty pallets 204 to a work station that is available or ready to accept an empty pallet 204. A pallet return control device regulated by the control panel 252 is used to direct or otherwise remove the empty pallet 204 to the available work station by causing it to move from the conveyor onto a ramp or other delivery member. The ramp is adjacent the assembler at the work station so that the assembler can remove the empty pallet 204 from the ramp. The empty pallet 204 can then be loaded by the assembler with additional fishing assemblies 10 for subsequent bonding of their weed guard devices 18 to their respective fish hook units 14.

When using the fishing assembly 10, the weed guard device 18 including the guard section 70 outwardly bounds or surrounds the fish hook unit 14, particularly the hook tips 34*a*,34*b*,34*c* thereof so that entanglements are avoided between weeds and the fish hook tips 34*a*,34*b*,34*c*. When a fish strikes or bites the fishing assembly 10, one or more of the leg members 54,58,62, including each guard section, are caused to move inwardly to thereby expose one or more of the hook tips 34*a*,34*b*,34*c*. The fish thereby grabs or bites the hook tips causing them to pierce the mouth of the fish.

The foregoing discussion has been presented for purposes of illustration and description. Further, the description is not intended to limit the invention to the form disclosed herein. Variations and modifications commensurate with the above teachings, within the skill and knowledge of the relevant art, are within the scope of the present invention. The embodiments hereinabove are further intended to explain the best modes presently known of practicing the invention and to enable others skilled in the art to utilize the invention as presented, or in other embodiments, and with the various modifications required by the particular applications or uses of the invention. It is intended that the appended claims be construed to include alternative embodiments to the extent permitted by the prior art.

What is claimed is:

1. A fishing assembly, comprising:
   a fish hook including an eyelet, a shank connected to said eyelet, and a hook section connected to said shank, with said hook section terminating in a hook tip with a pointed end and a barb; and
   a weed guard device including:
      a center member having a width and a slot;
      an attachment section joined to said center member and having a length and a width;
      a guard section having a width and joined to said attachment section, said guard section including an opening, with said guard section being bent to define an upper portion and a lower portion, said upper portion terminating in an upper end and said lower portion terminating in a free end, said pointed end of said hook tip being located above said free end but being located closer to said lower portion than to said upper end; and
   means for securing said weed guard device to said fish hook.

2. A fishing assembly, as claimed in claim 1, wherein:
   said hook section includes a barb that is located below said free end.

3. A fishing assembly, as claimed in claim 1, wherein:

said width of said attachment section is no greater than one fourth said width of said guard section.

4. A fishing assembly, as claimed in claim 1, wherein:

said width of said guard section is greater than said width of said attachment section.

5. A fishing assembly, as claimed in claim 1, wherein:

said hook tip extends through said lower portion and is spaced at least one hook wire diameter from said guard section.

6. A fishing assembly, as claimed in claim 5, wherein:

said upper portion has a greater length than said lower portion.

7. A fishing assembly, as claimed in claim 5, wherein:

said upper portion is contained in a plane and at least some portions of said hook tip are substantially in said plane.

8. A fishing assembly, as claimed in claim 1, wherein:

said center member includes at least one anchor member that extends in a direction towards said eyelet.

9. A fishing assembly, as claimed in claim 1, wherein:

said sender member includes a closable member and said slot includes a closable end in which said closable member is movable to close off said closable end of said slot.

10. A fishing assembly, as claimed in claim 9, wherein:

said viscous means substantially fills said center member slot.

11. A fishing assembly, as claimed in claim 10, wherein:

said center member includes tabs on opposing sides of said eyelet and a mound of said viscous means is created to substantially cover said tabs.

12. A fishing assembly, as claimed in claim 1, wherein:

said means for securing includes viscous means applied to said fish hook and said center member, said viscous means hardening for connecting said fish hook and said center member together with said eyelet being disposed through said slot of said center member and said eyelet remaining in a position in said slot that is the same before and after said viscous means is applied.

* * * * *